Figure 1:
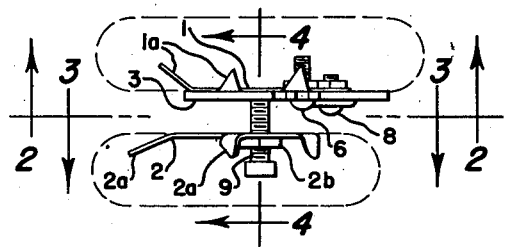

Oct. 7, 1952 H. AVARY 2,612,688
VERTICAL OPENING GOTHIC ARCH TRACING DEVICE
Filed Oct. 15, 1949

INVENTOR.
HUGH AVARY
BY
Wm. H. Dean
AGENT

Patented Oct. 7, 1952

2,612,688

UNITED STATES PATENT OFFICE 2,612,688

VERTICAL OPENING GOTHIC ARCH TRACING DEVICE

Hugh Avary, San Diego, Calif.

Application October 15, 1949, Serial No. 121,592

5 Claims. (Cl. 32—19)

My invention relates to a vertical opening Gothic arch tracing device, more particularly for use in accurately reproducing characteristics of original dentures in artificial dentures, and the objects of my invention are:

First, to provide a vertical opening Gothic arch tracing device which incorporates centric locating means adapted to directly relate the upper and the lower plates of the device so that they may be transferred to a conventional articulator in connection with bite blocks, or the like, for setting the artificial dentures in precise relationship to each other;

Second, to provide a vertical opening Gothic arch tracing device of this class which incorporates a pair of plates adapted to be secured to bite blocks, or the like, having adjustable centric locating means which may be aligned with the apex of the Gothic arch tracing, all of which may be viewed intermediate the plates when in the patient's mouth, permitting the dentist to accurately determine the centric location of said plates relative to each other;

Third, to provide a vertical opening Gothic arch tracing device of this class having a pair of plates adapted to be secured in opposed relationship to each other in connection with bite blocks, or the like, having centric locating means which may be vertically separated by opening the plates away from each other, so that movements of a patient's jaws accurately disclose the actual centric relationship to be followed in the production of the artificial dentures;

Fourth, to provide a vertical opening Gothic arch tracing device of this class having a pair of plates provided with angular corner portions adapted to be indented in conventional bite blocks, or the like, whereby secure fixed relationship of the plates may be readily attained, which prevents the subsequent shifting of the plates relative to the bite blocks, or the like, so that accuracy is maintained throughout the measurement of the patient's jaw movements and production of the artificial dentures;

Fifth, to provide a vertical opening Gothic arch tracing device of this class having a pair of opposed plates adapted to be secured to bite blocks, or the like, and provided with a secondary plate having a centric location opening therein, which is adjustable on one of the first-mentioned plates to coincide with the apex of a Gothic arch, which may be traced on the plate adjacent thereto by means of an adjustable pointed screw secured to the opposite of the first-mentioned plates, which conforms, at its end portion, with the centric location opening in said second-mentioned plate; and Sixth, to provide a vertical opening Gothic arch tracing device of this class which is very simple and economical of construction, efficient in operation, and which will not readily deteriorate or get out of order.

Figure 2:
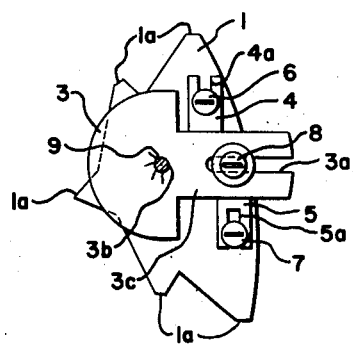
Figure 3:
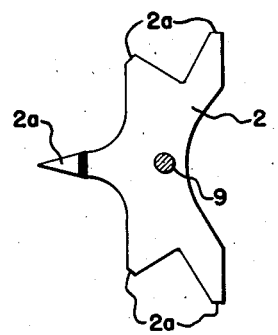
Figure 4:
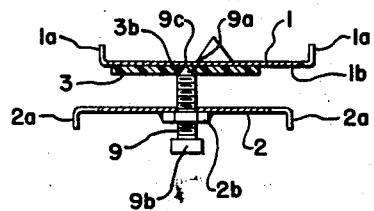

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of my vertical opening Gothic arch tracing device, illustrating by dash lines bite blocks to which said device is secured; Fig. 2 is a sectional view, taken from the line 2—2 of Fig. 1; Fig. 3 is a sectional view, taken from the line 3—3 of Fig. 1; and Fig. 4 is a sectional view, taken from the line 4—4 of Fig. 1.

Similar characters of reference refer to similar parts and portions throughout the several views of the drawings.

The plates 1, 2 and 3, stops 4 and 5, screws 6, 7, and 8, and the centric location screw 9, constitute the principal parts and portions of my vertical opening Gothic arch tracing device.

The plate 1 is substantially flat, and provided with a plurality of angular tongue portions 1a, which are disposed at the extremities of the plate 1 and adapted to be imbedded in the material of a conventional bite block or the like, for securely locating and fixing the plate in connection with the bite block, so that inaccuracies due to shifting of the plate relative to the bite block are eliminated. The plate 2 is provided with angular tongues 2a similar to the tongues 1a hereinbefore described in connection with the plate 1.

The screws 6, 7 and 8 are screw-threaded in the plate 1 and extend through U-shaped portions of the stops 4 and 5, and the plate 3, respectively. It will be noted that the U-shaped portions of the stops 4 and 5 and plate 3 incorporate slotted portions 4a, 5a and 3a, respectively, which are slidably adjustable over the screws 6, 7 and 8, relatively to the plate 1. The plate 3 is provided with a diverging recess portion 3b which diverges away from the plate 1 and is adapted to receive the conforming cone point 9a of the screw 9, which is screw-threaded in the nut portion 2b of the plate 2. The screw 9, which is the centric location screw, is provided with a head 9b, arranged for use in ejecting the screw relative to the plates 1 and 3 at its cone point portion 9a.

This cone portion 9a is arranged to scribe a Gothic arch tracing on the normally lower side 1b of the plate 1 when the plate 3 is removed. The preferred method of making the tracing on the lower side 1b of the plate 1 is to first coat said surface 1b with a thin coating of colored wax, or other suitable material which may be scribed. The point 9c then penetrates the wax and reveals the bare surface of the metal at the lower side 1b of the plate 1, all as will be hereinafter elaborated upon in the description of the operation of my vertical opening Gothic arch tracing device.

The operation of my vertical opening Gothic arch tracing device is substantially as follows: The plates 1 and 2 are first secured in connection with conventional bite blocks by imbedding the points 1a and 2a, respectively, thereof in the bite blocks at their outer portions. The surface 1b of the plate 1 is coated with material in which a tracing may be made by the point 9c of the centric location screw 9. The centric location screw 9 is then vertically adjusted to attain the proper vertical spacing of the plates 1 and 2, in accordance with the requirements for the particular patient.

The patient is then instructed to make the tracing by moving the jaw and actuating the plate 2, together with the centric location screw 9, relative to the plate 1. As the patient moves the plate 2 relative to the plate 1, the point 9c traces the Gothic arch on the lower surface 1b of the plate 1, in accordance with the mechanical movements of the particular patient. The plate 3 is then secured to the lower side of the plate 1 by means of the screw 8, as shown in Fig. 2 of the drawings, and the center of the opening 3b in the plate 3 is positioned at the apex of the Gothic arch tracing on the lower side 1b of the plate 1. The plate 3 is then fixed in this position by the adjustable stops 4 and 5, which are secured in place at opposite sides of the plate 3, at its shank portion 3c, by means of the screws 6 and 7, all as shown best in Fig. 2 of the drawings. Thus, the plate 3 cannot move relative to the plate 1.

The plate 3, together with the bite block which is secured thereto, is replaced in the mouth of the patient, and the patient is instructed to vertically open and close the plates 1 and 2 relative to each other, so that the dentist may determine that the centric location screw 9, at its cone portion 9a, passes directly into the recess 3b in the plate 3, with normal opening and closing movement of the patient's jaw. The dentist may view the cone portion 9a as it passes into the conforming recess 3b in the plate 3 by peering between the plates 1 and 2. It will be noted that the plate 3 may be made of transparent material to facilitate the view of the cone portion 9a passing into said conforming recess 3b.

After the centric location of the bite blocks relative to each other has been thus determined, the bite blocks, as illustrated by dash lines in Fig. 1 of the drawings, are cemented together while the cone portion 9a is directly aligned and conforming with the recess 3b in the plate 3. Both bite blocks, together with the vertical opening Gothic arch tracing device, are then removed from the patient's mouth in a unitary assembly, and the bite blocks may then be fixed to a conventional articulator in the conventional manner, following which teeth may be accurately set up in connection with the articulator on which the bite blocks have been secured in centric relationship to each other, as controlled by the centric positioning of the cone portion 9a of the screw 9 in the recess 3b, which conforms therewith, as hereinbefore described.

It will be here noted that the centric relationship of the plates 1 and 2 may be maintained by the screw 9, engaged with the plate 3 in centric position during the setting of the teeth in the conventional articulator. During the setting of the teeth, a view of the centric relationship of the screw 9 with the recess 3b in the plate 3 may be noted by the technician.

Having thus shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a vertical opening Gothic arch tracing device, a pair of plates adapted to be individually secured in opposed relationship to each other in connection with a pair of bite blocks, or the like, one of said plates having an adjustable screw provided with a cone point portion directed toward the other of the plates, the other of said plates having a secondary plate adjustably mounted in connection therewith, provided with a cone recess adapted to conform with the cone point of said screw, adjustable stops engageable with said secondary plate secured to said other plate.

2. In a vertical opening Gothic arch tracing device, a pair of plates adapted to be individually secured in opposed relationship to each other in connection with a pair of bite blocks, or the like, one of said plates having an adjustable screw provided with a cone point portion directed toward the other of the plates, the other of said plates having a secondary plate adjustably mounted in connection therewith, provided with a cone recess adapted to conform with the cone point of said screw, adjustable stops engageable with said secondary plate secured to said other plate, both of said first-mentioned plates having angular tongue portions adapted to be imbedded in conventional bite blocks, or the like.

3. In a vertical opening Gothic arch tracing device, upper and lower plates adapted to be secured to upper and lower bite blocks, respectively, one of said plates having a vertically adjustable screw in connection therewith, provided with a pointed end portion, the other of said plates having a secondary adjustable plate in connection therewith, incorporating a recess conforming with the pointed portion of said adjustable screw, stops adjustably mounted on said other plate, having slots therein, and screws extending through said slots and into said other plate for fixing said secondary plate securely thereto.

4. In a vertical opening Gothic arch tracing device, upper and lower plates adapted to be secured to upper and lower bite blocks, respectively, one of said plates having a vertically adjustable screw in connection therewith, provided with a pointed end portion, the other of said plates having a secondary adjustable plate in connection therewith, incorporating a recess conforming with the pointed portion of said adjustable screw, stops adjustably mounted on said other plate, having slots therein, and screws extending through said slots and into said other plate for fixing said secondary plate securely thereto, said second-mentioned plate having a slotted portion therein and another screw extending through the slotted portion in said secondary plate and screw-threaded in said other plate.

5. In a vertical opening Gothic arch tracing device, upper and lower plates adapted to be secured to upper and lower bite blocks, respectively, one of said plates having a vertically adjustable screw in connection therewith, provided with a pointed end portion, the other of said plates having a secondary adjustable plate in connection therewith, incorporating a recess conforming with the pointed portion of said adjustable screw, stops adjustably mounted on said other plate, having slots therein, and screws extending through said slots and into said other plate for fixing said secondary plate securely thereto, said second-mentioned plate having a slotted portion therein and another screw extending through the slotted portion in said secondary plate and screw-threaded in said other plate, said upper and lower plates having angular tongue portions adapted to be imbedded in bite blocks, or the like.

HUGH AVARY.

REFERENCES CITED

The following references are of record in the file of this patent:

UNITED STATES PATENTS

| Number | Name | Date |
| --- | --- | --- |
| 2,001,963 | Keller | May 21, 1935 |
| 2,027,373 | Eden | Jan. 14, 1936 |
| 2,183,512 | Brenner | Dec. 12, 1939 |
| 2,310,360 | Fischer | Feb. 9, 1943 |
| 2,562,106 | Leathers | July 24, 1951 |